United States Patent [19]

Jacobsen

[11] 4,318,550

[45] Mar. 9, 1982

[54] HYDROPNEUMATIC SYSTEM

[75] Inventor: LeRoy V. Jacobsen, Clinton, Iowa

[73] Assignee: Central Hydraulics Co., Clinton, Iowa

[21] Appl. No.: 88,297

[22] Filed: Oct. 26, 1979

[51] Int. Cl.³ .......................... B60S 9/10; F15B 13/02
[52] U.S. Cl. .................................... 280/766; 60/419;
60/478; 60/486; 91/4 R
[58] Field of Search .............. 91/4; 137/255; 280/766;
60/421, 428, 429, 478, 486, 593, 586, 587, 419

[56] References Cited

U.S. PATENT DOCUMENTS

| | | | |
|---|---|---|---|
| 2,239,893 | 4/1941 | Jackman, Jr. ......................... | 91/4 R |
| 3,100,965 | 8/1963 | Blackburn ............................. | 91/4 R |
| 3,177,664 | 4/1965 | Konkle ................................... | 60/415 |
| 3,447,319 | 6/1969 | Konkle ................................... | 60/419 |
| 3,648,458 | 3/1972 | McAlister ......................... | 60/486 X |
| 3,802,318 | 4/1974 | Sibbald ................................... | 91/4 R |
| 3,853,037 | 12/1974 | Denzler et al. ................... | 91/442 X |
| 4,223,531 | 9/1980 | Fukunaga et al. .................... | 91/4 R |

Primary Examiner—Irwin C. Cohen
Attorney, Agent, or Firm—Kalish & Gilster

[57] ABSTRACT

A hydropneumatic system, especially for operating landing gear of truck trailers, is operable from a source of pressurized air. The system includes separate first and second hydraulic fluid sources. Dual hydraulic cylinders are operated by the fluid. Each has a piston and an extensible member connected to the piston for providing extension and retraction of the gear legs in response to hydraulic pressure in chambers on opposite sides of the pistons. An air valve provides the pressurized air to one of the fluid sources for enabling it to provide hydraulic fluid. An air-operated hydraulic pressure boosting pump is selectively operable to boost the hydraulic fluid pressure thus provided to much greater than air pressure. A control valve selectively connects the hydraulic pressure booster to either the first or second chamber of each hydraulic cylinder for receiving the pressure-boosted hydraulic fluid for gear legs extension or retraction, while connecting the second or first chambers, respectively, to the nonselected hydraulic fluid source for returning hydraulic fluid. Each cylinder includes a pressure release valve to keep the landing gear extended until released by hydraulic pressure provided for retraction. The hydraulic pressure booster is of a reciprocating piston pump type and has an air pressure valving arrangement conserving air provided to its piston and ensuring proper piston reciprocation.

10 Claims, 4 Drawing Figures

HYDROPNEUMATIC SYSTEM

BACKGROUND AND SUMMARY OF THE INVENTION

This invention relates in general to systems operated by fluids under pressure and, more particularly, to a hydropneumatic system particularly suited for operation of a hydraulic truck trailer landing gear.

The present invention constitutes an improvement over the type of hydropneumatic landing gear systems disclosed in U.S. Pat. Nos. 3,177,664 and 3,447,319, each entitled Hydropneumatic System and in the name of R. L. Konkle.

In both of said patents, air is introduced into landing gear leg assemblies of the systems. It has been found that moisture entrained in the air can cause corrosion within the landing gear assemblies which may result in sticking, uneven operation, failure of the legs to extend or retract properly, and malfunctioning of components within the legs. Moreover, under some circumstances, high usage of air for operation of these known systems may result from actuating an air-hydraulic booster pump of said systems. Such usage could, under extreme circumstances, exhaust the air supply of a tractor-trailer, particularly if the tractor engine is not operating whereby its air compressor is not continually replenishing the air consumed by operation of the hydropneumatic system.

It is an object of the present invention to provide a system wherein a liquid, such as hydraulic oil, may be motivated by a pressurized gas, such as air.

It is a further object of the present invention to provide a system for operating landing gear of truck trailers in tractor-trailer combinations, which system is operative in response to motivating air pressure obtained from the air brake system of the tractor.

It is another object of the present invention to provide a tractor-trailer landing gear actuating system of the type stated wherein novel means are presented for increasing the pressure applied to hydraulic fluid at any desired multiple of the line pressure of the air in the tractor brake system so that requisite forces provided for independently and reliably supporting the trailer together with its load.

It is another object of the present invention to provide a landing gear actuating system for tractor-trailer combinations which includes conveniently accessible, manually controllable valves for expeditious operation so that extension and retraction of the landing gear may be effected with minimum effort on the part of the user without requiring developed skill for operation thereof.

It is a still further object of the present invention to provide a landing gear system of the type stated which incorporates valve means conducing to efficient and rapid operation of the system as well as for assuring that complete safety of the system in any selected condition so that accidental, premature or unauthorized movement of the supporting leg, i.e., the landing gear, is prevented.

It is another object of the present invention to provide a landing gear system of the type stated including landing gear actuating cylinders wherein only hydraulic fluid is introduced and where air is not present in such cylinders which might cause corrosion, sticking, and the like.

It is another object of the present invention to provide a tractor-trailer landing gear system of the type stated wherein hydraulic fluid can be introduced into cylinders of the landing gear legs under high pressure for either extension or retraction purposes.

It is yet another object of the present invention to provide a tractor-trailer landing gear system of the type stated wherein the hydraulic landing gear actuating cylinders can be simultaneously or individually extended or retracted for leveling of a trailer.

It is a further object of the present invention to provide a tractor-trailer landing gear system of the type stated utilizing air from the airbrake system of the tractor but which makes efficient and effective use of such air to prevent wasting thereof or exhausting of the tractor air supply while ensuring proper operation of the system for hydraulic fluid pressure boosting purposes.

It is a still further object of the present invention to provide a tractor-trailer landing gear system of the type stated which is comprised of a minimum of parts; which is resistant to breakdowns; which can be easily provided upon existing truck equipment without requiring costly structural modification thereof; which is entirely automatic in operation; which obviates arduous physical effort by trucking personnel; which is economically produced; and which is durable in operation.

Other objects and details of the system will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
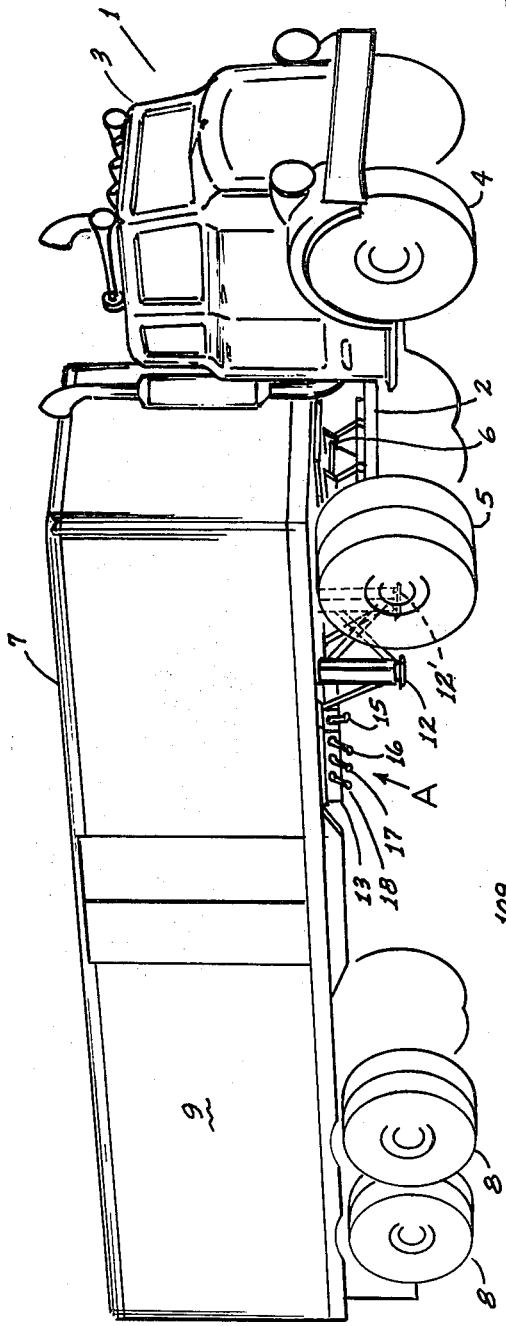
FIG. 1 is a perspective view of a tractor-trailer combination having mounted thereon a trailer landing gear system constructed in accordance with and embodying the present invention.

Referring now by reference characters to the drawings which illustrate the preferred embodiment of the present invention. A generally designates a hydropneumatic system which is shown herein, for purposes of illustration only, as associated with a combination tractor-trailer for operating landing gear therefor, whereby upon disengagement of the tractor, the trailer will be fully and reliably supported, as for unloading and loading operations. A tractor of customary design is indicated 1 and is provided with a frame 2, cab 3, front rear wheels 4, 5, respectively, and a fifth wheel or hitch 6 carried on frame 2 for detachable securement to a load-carrying trailer 7. Said trailer 7 comprises, broadly, rear sets of wheels 8 and a body 9 mounted upon a frame (not shown) as well as means for suitable union with hitch wheel 6. Tractor 1 and trailer 7 are equipped with the usual air brake systems (not shown) wherein the trailer air brakes are adapted for connection to that of the tractor 1, upon coupling therewith, as by suitable valve-controlled service lines, all as is well known in the art. System A of the present invention is engaged to the tractor air brake system so that air under the particular pressure of such latter system is supplied to system A as the motivating force therefor; the connecting or supply line being designated 10 in the drawings.

The landing gear comprises basically a pair of extendable and retractable landing gear leg assemblies 12,12' which are laterally aligned and mounted in depending relationship from the forward undersurface of trailer body 9. The system for actuating such legs includes an enclosure or housing 13 carried beneath such trailer body 9 in immediate adjacency to the landing gear leg assemblies 12,12'. Said housing 13 contains hydropneumatic operating components of the system and is located adjacent one side of the trailer body 9 for convenient presentation of a plurality of hand levers 15, 16, 17, and 18 which are readily manipulated by trucking personnel for the purpose of extending or retracting the gear legs.

Each said landing gear assembly 12,12' is substantially identical, said assemblies including respective cylindrical housings 20,20' from which respective legs 21,21' of cylindrical form are each adapted to extend or retract, said legs having respective shoes 22,22' of circular shape adapted to bear upon the ground for the purpose of supporting a heavy truck trailer which may weigh, when laden, many tens of thousands of pounds. It is desirable not only that the hydropneumatic system of the invention be capable of providing requisite pressure for lifting such a great weight but also that the system be capable of maintaining the raised condition of the trailer without any possibility that the landing gear legs, having been extended, subsequently could inadvertently and prematurely retract. Therefore, the present apparatus is designed to ensure that the legs, having been extended, will not accidently or unintendedly retract.

Hydraulic fluid under pressure is provided to each of landing gear assemblies 12,12' for both extension and retraction purposes. Each such assembly is substantially identical. Assembly 12 includes a hydraulic fluid port 24 through which such fluid may be introduced under pressure for extension of the leg 21 while at the same time hydraulic fluid leaves the cylinder 20 through another port 25. Conversely, hydraulic fluid under pressure is admitted through port 25, while leaving cylinder 20 through port 24, for retraction of the landing gear leg 21.

Landing gear assembly 12' has similar ports 24' and 25'. A connection block 27 is provided proximate one face of housing 13, hydraulic lines or conduits being routed from such block to the respective landing gear assemblies 12,12'. Thus, conduits 28,28' extend between block 27 and ports 24,24'. Similarly, a conduit 30 interconnects block 27 and port 25 of assembly 12, as well as port 25' of assembly 12' via an extension 30' of conduit 30.

Port 25 communicates with an annular passage or chamber 32 defined by the innersurface of a bore 33 of a piston rod 34 extending longitudinally of cylinder 20, and the outer surface of a tubular member 36 which is disposed concentrically within said bore 33 and is of substantially like vertical extent. piston rod 34 is integral within a flanged closure plate 37 at its upper end. Provided in the wall of piston rod 34 proximate its lower end is an orifice 39 for effecting communication between chamber 32 and a first annular volume or chamber 40 surrounding said piston rod 34. Said volume 40 is determined at its upper end by an upper piston head 42. A cylindrical outer wall 43 defines the outer surface of cylinder 20. Wall 43 is closed at its lower end by shoe 22. Fixed at the lower end of piston rod 34 is a lower piston 45, the outer surface of which is in fluid-tight, slideable engagement with the innerface of cylinder 43. The upper surface of piston 45 provides the lower limits of volume 40. Formed on the underface of head 45 are a plurality of apertures 46 which define a second annular volume or chamber 47 communication with the lower end of tubular member 36. Head 42 is provided with a bore 48 to provide a fluid-tight sliding seal with piston rod 34 so that the same, together with cylinder 43 and shoe 22, may be moved between the extended and retracted positions in response to hydraulic fluid under pressure introduced into either of ports 24 or 25, respectively. Thus, chamber 47 enlarges as hydraulic fluid is forced into it for gear leg extension, while chamber 40 reduces in volume as head 42 moves toward piston 45, as shown in phantom at 42'.

It is observed that for extension and retraction purposes, the chambers 40,46 within each landing gear assembly 12,12' on opposite sides of piston 45 are filled solely with hydraulic fluid rather than air. Thus, no opportunity exists for moisture entrained with air to enter these landing gear chambers to cause corrosion and attendant problems, such as sticking, scruffing, pitting, etc.

Air for operation of the system is supplied by conduit 10 which is interconnected with the air brake system with which trailer 7 is equipped, such conduit being connected to block 27, there being an extension 10' of conduit 10 through which the air, which may be under pressure, is typically 100-120 psi, is provided to a tank pressure valve 51 and pump valve 52 by means of respective air inlets 54,55 thereof. Pump valve has a valve body 53 (see FIGS. 3 and 4) operated by handle 15 for purposes soon to be apparent while pressure valve 51 comprises two outlet ports 56,56' and a conventional valve body 58 (see FIGS. 3 and 4) adapted to be rotated within valve 51 by handle 16 which extends outwardly from the side of housing 13, such handle having a center off position shown in FIG. 2, and being selectively movable to either side of the off position, i.e., to the position shown in FIG. 3 or to an opposite position shown in FIG. 4. In its FIG. 3 position, handle 16 positions valve body 58 for connecting pressure inlet port 54 to outlet port 56, which is interconnected by means of a conduit 62 with the top of the hydraulic fluid reservoir 63 which, assuming that the landing gear legs 21,21' are retracted, is substantially filled with a quantity 64 of hydraulic fluid, which may be introduced through a fill port 65.

Outlet port 56' is connected by a corresponding conduit 62' with the substantially identical reservoir 63' which, when the legs are in their retracted position, has only a small amount of hydraulic fluid 64' (FIG. 3) therein. When handle 16 is in its FIG. 3 position, conduit 62' is connected by valve body 58 to an exhaust port 65 of valve 51, venting conduit 62' to atmospheric pressure. It will be apparent from reference to FIG. 4 that handle 16 is moved to the opposite position shown therein, valve body 58 will connect pressure inlet port 54 to conduit 56' while connecting outlet port 56 to exhaust port 67. Accordingly, tank pressure valve 51 is operable to selectively connect the air pressure line 62,62' to either tank 63 or 63' for selective pressurization of one of the tanks.

Each of tanks 63,63' is provided with a respective hydraulic fluid outlet port 69,69' and then hydraulic fluid inlet port 70,70'. Interconnected with the fluid outlet ports 69,69' are respective conduits 72,72' which extend to respective check valves 73,73', which are interconnected by a union 75 for providing connection to a single conduit 76. Said check valve 73,73' are of conventional spring loaded configuration, each being oriented from preventing hydraulic fluid from flowing through the respective conduits 72,72' into fluid outlets 69,69' but, conversely, from preventing hydraulic fluid from flowing from the respective outlets 69,69' in response to air pressure provided to the selected tanks 63,63'. Thus, it will be understood that, since valve 51 permits pressurization of only a selected one of tanks 63,63', which serve as sources of hydraulic fluid for extension and retraction, respectively, of the landing gear legs 21,21', hydraulic fluid will flow through only one of check valves 73,73', for any given mode of operation of the system, into conduit 76.

Conduit 76 is interconnected to a hydraulic fluid pumping chamber head 78 of an air-operated hydraulic fluid pressure boosting pump 79 which is more fully described hereinbelow. Hydraulic fluid may flow through said chamber 78, in the absence of operation of said pump 79, and through a further conduit 81 having therein a check valve 82 of the spring loaded type preventing hydraulic fluid from flowing through said valve in the direction of the pump chamber 78 but permitting pressure to flow from said chamber 78 and through conduit 81 and thence into a further high pressure conduit 81' which is interconnected with the pressure port 83 of a first flow control valve 84, said valve having a valve body 86 (FIGS. 3 and 4) which is interconnected mechanically, as indicated in dotted line at 87 with a valve body 89 of a further flow control valve 90, both being adapted to be operated by a single handle 18, such handle being selectively positionable to either side of a center-off position.

Figure 3:
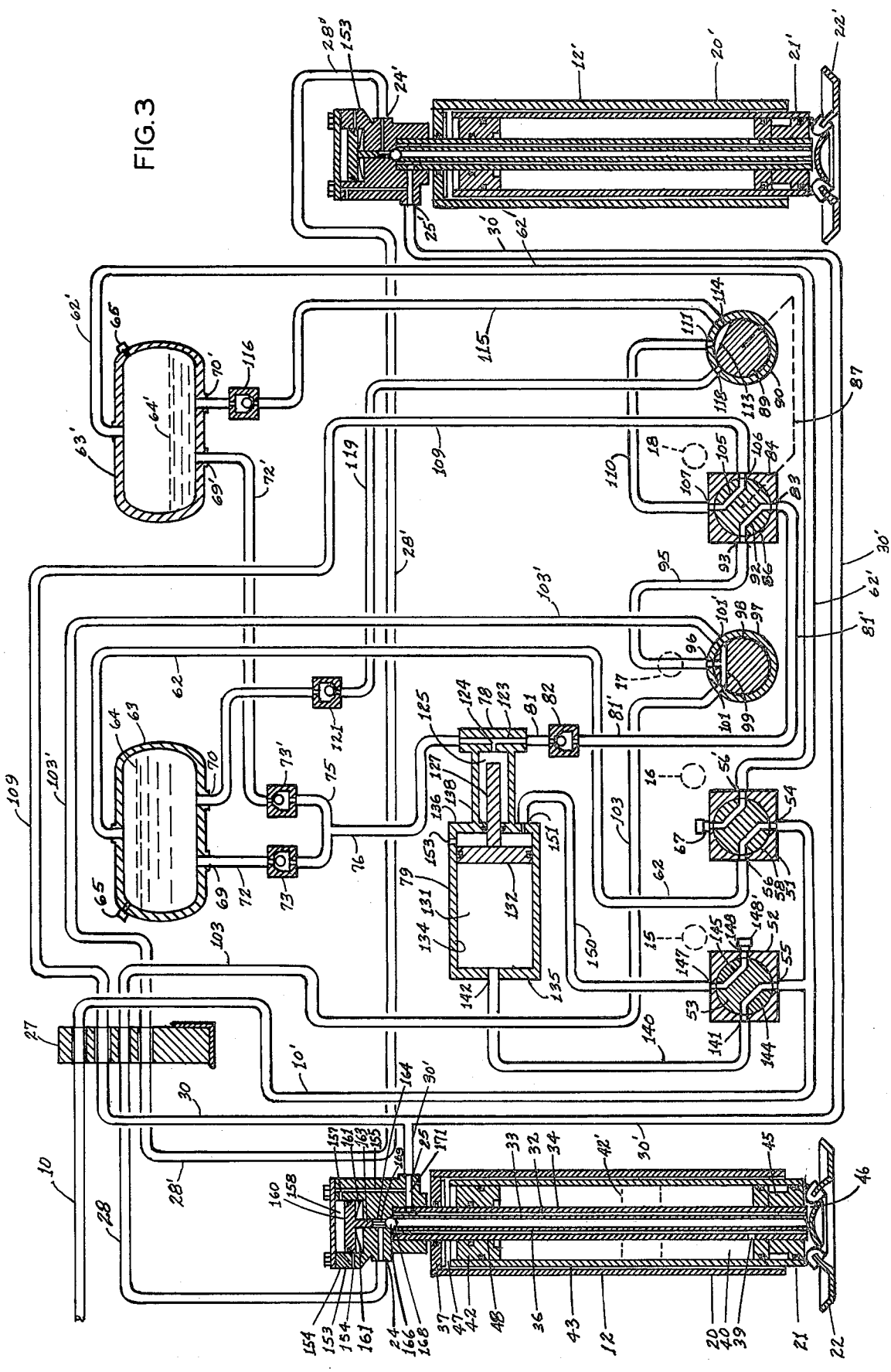
FIG. 3 is a line schematic diagram of the system illustrating components configured for causing extension of the landing gear legs.

In FIG. 3, handle 18 is shown positioned for causing extension of the landing gear legs 21,21'. In this position, valve body 86 is adapted to interconnect pressure inlet 83 by means of a passage 92 with an outlet port 93 which is interconnected by means of a conduit 95 with an inlet port 96 of a leveling valve 97 including a valve body 98 including a passage 99 for selectively connecting inlet 96 with either or both of a pair of outlet ports 101,101'. The latter are respectively interconnected with connection block 27 by respective flow pressure conduits 103,103'. At block 27 the latter are respectively interconnected with conduits 28,28' which extend to the extension ports 24,24', respectively, of the landing gear leg cylinders. Valve body 98 is selectively positionable by handle 17 which, in the center position, causes inlet 96 to be connected to each of ports 101,101' and with the handle being positionable to either side of its center position for purposes hereinbelow described, but the same may be assumed for the present to be in the center position whereupon it will be apparent that conduit 95 is effectively interconnected with each of the extension ports 24,24' of the landing gear cylinders.

Valve body 86 of flow control valve 84 when in the position shown in FIG. 3 also has a passage 105 which interconnects two further ports 106,107 of the valve, port 106 being interconnected by means of a conduit 109 extending from port 106 to block 27 where it is interconnected with conduit 30 which communicates with the fluid return ports 25,25' of each of the landing gear cylinders. Port 107 is interconnected by a conduit 110 with a port 111 of valve 90. The latter port, in the orientation of handle 18 shown in FIG. 3, is interconnected by means of a passage 113 with a further port 114 which in turn is interconnected by means of a fluid conduit 115 with the hydraulic fluid inlet port 70' of reservoir 63' through a check valve 116 which permits hydraulic fluid to flow only from valve port 114 to reservoir port 70' for hydraulic fluid return purposes.

Figure 4:
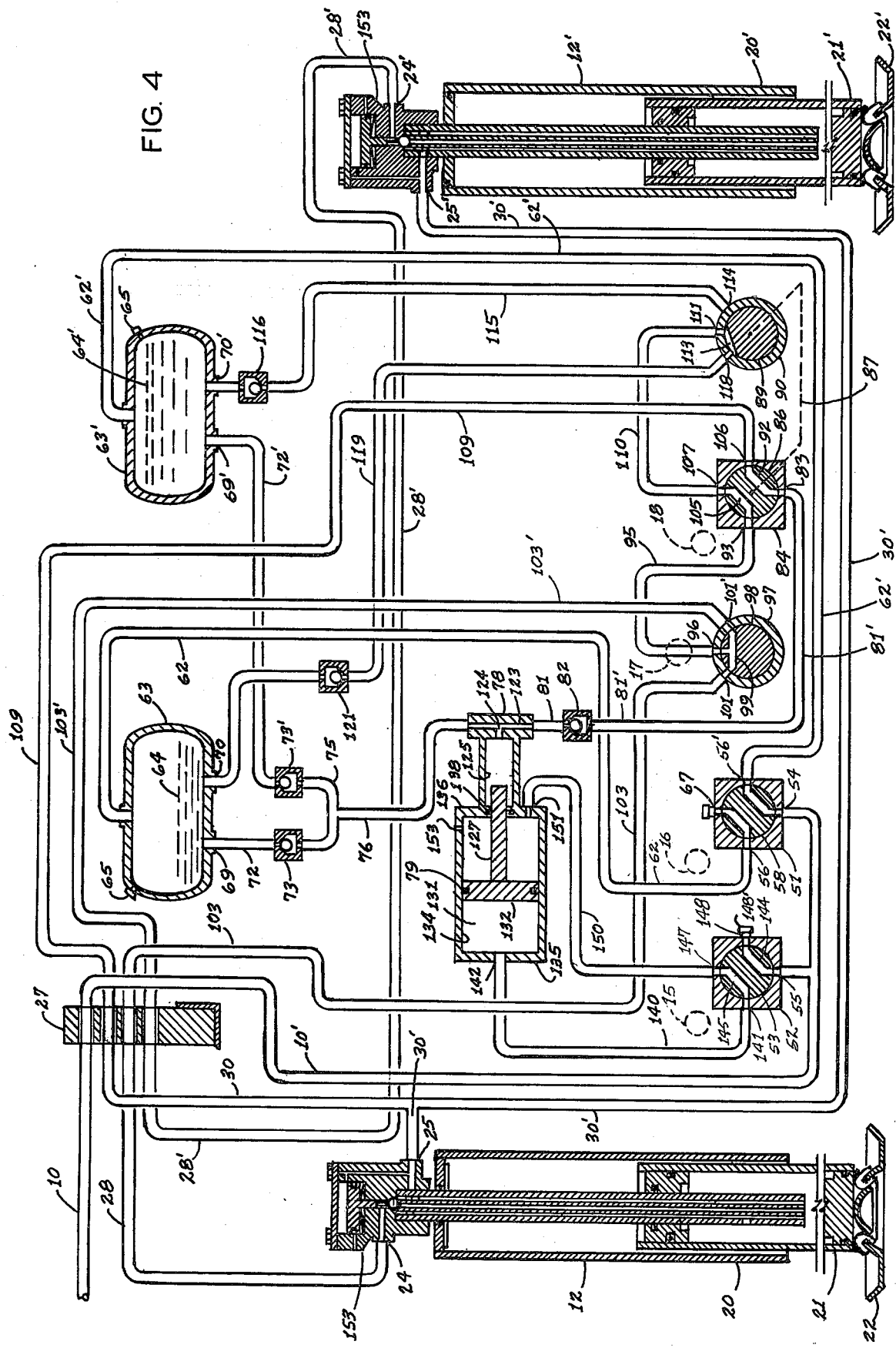
FIG. 4 is a line schematic diagram of the system illustrating components configured for causing retraction of the landing gear legs.

Referring to FIG. 4, handle 18 is selectively positionable to an opposite position wherein said valve passage 113 interconnects port 111 with a port 118 which is interconnected by means of a fluid conduit 119 with the hydraulic return port 70 of reservoir 63, said conduit similarly including a check valve 121 permitting hydraulic fluid to flow only from port 118 to port 70 for return of hydraulic fluid to the reservoir. Also, when positioned as in FIG. 4, handle 118 orients valve body 86 to cause passage 92 to interconnect pressure inlet port 83 of valve 84 to port 106 whereby hydraulic pressure is instead supplied to conduit 109. Similarly, passage 105 is positioned in FIG. 4 for interconnecting ports 93 and 107. But when valve body 89 is oriented as in FIG. 3, port 118 (to which fluid return conduit 119 is connected) is blocked by valve body 89. Similarly, when positioned as in FIG. 4, valve body 89 blocks port 114 to which fluid return 115 is connected.

Referring to FIG. 3, the hydraulic pressure boosting pump 79 will now be more fully described. Chamber head 78 includes a passage 123 through which conduit 76 and 81 communicate, passage 124 extending from passage 123 and opening into a hydraulic fluid chamber 125 of cylindrical form. A piston 127 is presented for axial, slideable reciprocating movement within chamber 125, which is defined by a narrow extension of a further cylinder 131. An air-driven piston 132 is presented in cylinder for axial reciprocating movement in response to air pressure controlled by pump valve 52. Cylinder 131 includes a cylindrical side wall 134 and end plates 135,136 end plate 136 having a seal 138 providing a slideable, fluid-tight sealing relationship around piston 127. The diameter of piston 132 is much greater than that of piston 127 for providing a ratio between the areas of the two pistons which is preferably about 25:1 whereby 100 psi of air pressure against the surface of piston 132 will cause approximately 2,500 psi of fluid air pressure to be developed within chamber 125 by piston 127.

A conduit 140 connects an outlet port 141 of pump valve 52 and an air inlet 142 in end plate 135. When valve body 53 is positioned as shown in FIG. 3 by movement of operating handle 15, valve body 53 presents a passage 144 which communicates with the air pressure inlet port 55 and outlet port 141 to supply vehicular air pressure through conduit 140 to the left side of piston 132 for movement of the same in the direction causing pressure of hydraulic fluid to be developed within chamber 125. Such pressure acts to close either of check valves 73 or 73' which may be open whereas check valve 82 permits such pressure to be developed in conduit 81' for purposes of either extending or retracting the landing gear legs. Also in the position shown in FIG. 3, valve body 53 presents a passage 145 for communication between ports 147,148 of the valve. Port 148 is blocked by a plug 148' whereas port 147 is interconnected by conduit 150 to a port 151 in end plate 136. However, a small aperture 153 is provided proximate end plate 136 whereby air in the volume between piston 132 and end plate 136 is permitted to escape.

Operation of pressure boosting pump 79 is effected by successive operation of valve handle 15 which may be moved first from its center-off position (FIG. 2), wherein each of ports 55,141,147, and 148 is blocked by valve body 53, to the position shown in FIG. 3 and subsequently to the position shown in FIG. 4. In the latter position, passage 144 interconnects port 55 with the blocked port 158 whereas passage 145 provides communication between the ports 141 and 147 whereby conduit 150 is interconnected with conduit 140 and with the residual air pressure developed within the volume bounded by piston 132 and end plate 135 being permitted to flow through conduits 140 and 150 and thence through port 151 to the other side of the pressure for assisting in its return toward end plate 135 for a further operating cycle upon repositioning of handle 15. Some exhaust air pressure is available for this purpose since aperture 153 does not immediately permit all the exhaust air thus supplied to escape.

In this way, the air pressure utilized for providing pumping stroke of boosting pump 79 is economically utilized for assisting in the return of air piston 132 without being wasted and also ensuring that additional force will be applied to piston 132 for repositioning thereof even in the absence of substantial hydraulic pressure within chamber 125, which pressure does ordinarily tend to drive piston 127 from chamber 125. But the apparatus entirely obviates use of a return spring as has heretofore been required in certain hydraulic boosting pumps of the prior art for the purpose of restoring the piston to its starting position.

The differential in the areas of hydraulic piston 127 and air piston 132 provide a most effective step-up or boosting air pressure, which may be as low as 60 psi without adversely effecting operation of the system, to a much higher hydraulic pressure which may vary between 1,500 and 3,000 psi, as necessary for the lifting of a heavily laden trailer by means of the hydraulic landing gear assemblies 12,12'. Handle 15 may be cycled a desired number of times by pumping of the pressure within the hydraulic lines to the level necessary for lifting of the trailer.

Referring to FIG. 3, each of the landing gear leg assemblies 12,12' is provided with means for preventing hydraulic fluid from prematurely flowing in an unauthorized, unintended manner from the hydraulic cylinder of each assembly when such fluid is present on the lower side of piston 45 in the annular space or chamber 46 for extension of the respective landing gear legs 21,21' thus precluding the possibility that there would be accidental or premature extension of the landing gear legs when trailer 7 is supported by legs 21,21'. For this purpose, there is integrally formed with each landing gear assembly 12,12' a valve apparatus which is mounted upwardly of closure plate 37 of the hydraulic cylinder, such apparatus being designated generally at 153.

Apparatus 153 encloses a cylindrical valve housing 154 within one side of which is provided an axial passage 155 which, at its lower end, is in communication with conduit 30' through port 25 and which, at its upper end, opens through a radially presented port 157 into a chamber 158. Within chamber 158, there is disposed for slideable vertical movement therein a piston 160 biased by a spring 161 engaging its under surface for being positioned upwardly within chamber 158.

Depending from the under surface of piston 160 and formed integrally therewith is a piston stem 163 which projects into a bore 164, said stem including a reduced diameter portion for engaging a ball valve 166 seated within the upper end of tubular member 36, the latter being aligned with bore 164 but having a relatively greater internal diameter so as to provide a valve seat 168 against which ball valve 166 is urged by a coil spring 169 located beneath the ball valve.

Also provided with cylindrical valve housing 154 is a radial passage 171 which opens to bore 164 at a point below the upper portion of piston stem 163 and which, at its outer end, is in communication with port 25 to which conduit 30' is connected. When hydraulic fluid is supplied through port 25, such fluid under pressure will exert pressure also through passage 155 and be exerted upon the upper face of piston 160 for overcoming the bias of spring 161 whereupon the piston stem 163 will force ball valve 166 off its seat 168 so that communication is effected between the interior of tubular member 36 and port 24, permitting hydraulic fluid to flow therefrom into conduit 28, all for purposes more fully developed hereinbelow.

Figure 2:
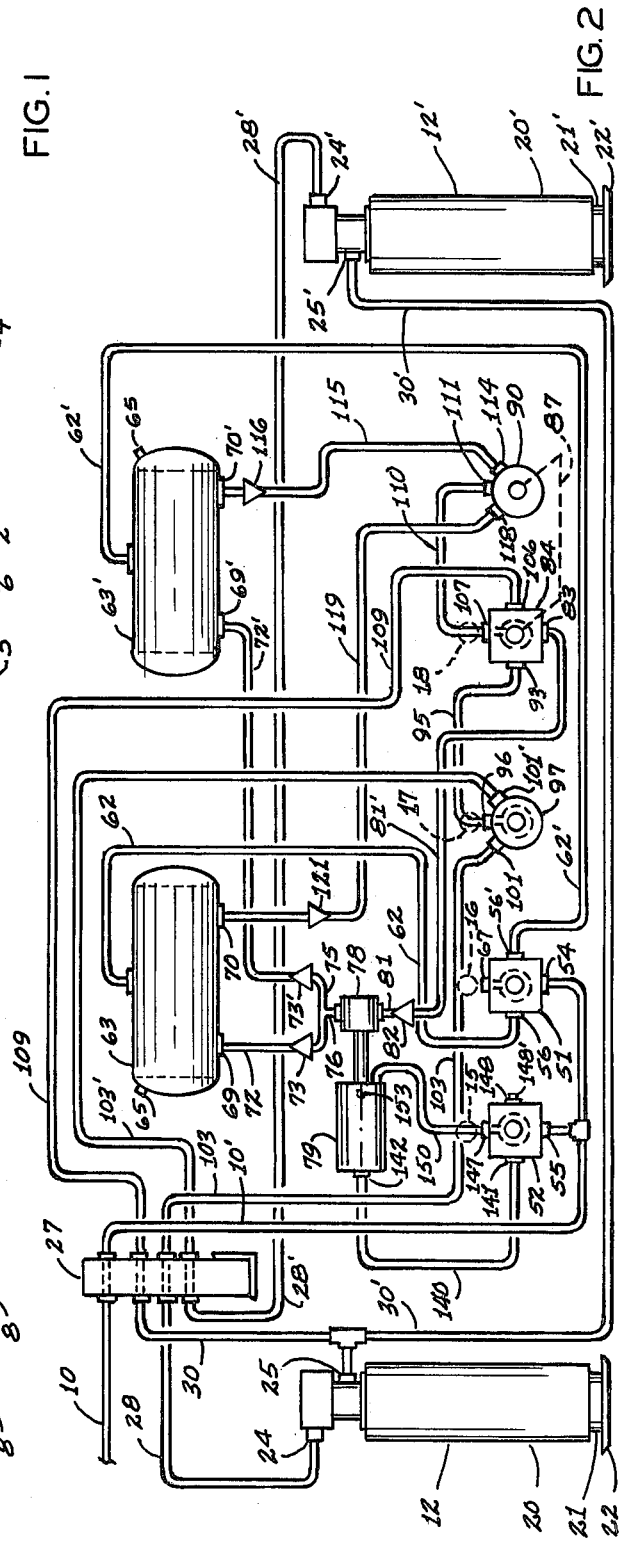
FIG. 2 is a diagram of the hydropneumatic system of the present invention illustrating the same with landing gear legs in retracted position.

Operation of the present invention is as follows:

When trailer 7 is being towed by tractor 1, the landing gear legs 21,21' will be retracted, of course, as shown in FIG. 1, and with the various control valve handles 15, 16, 17 and 18 being in the center-off position as previously described and as depicted in FIGS. 1 and 2. As will be apparent, no air pressure is provided to air reservoirs 63,63' and hence check valves 73,73' remain closed. In this retracted position, hydraulic fluid 64 within reservoir 63 is in the position shown in FIG. 3 and the reservoir is substantially filled. However, reservoir 63' contains relatively little hydraulic fluid 64' and with the balance of the hydraulic fluid which otherwise could be present in reservoir 63' being present within the chamber 40 of each landing gear cylinder. Also, as apparent, valve port 54 is blocked by valve 58 and the hydraulic boosting pump 79 is, therefore, inoperative.

Inasmuch as port 106 of flow control valve 84 is blocked by valve 86, hydraulic fluid is not permitted to flow from each chamber of each landing gear cylinder and hence the landing gear legs 21,21' are maintained reliably in retracted position to prevent any premature, accidental extension thereof.

It is desired to disconnect trailer 7 after it has reached its destination, as for loading or unloading. Tank pressure valve 51 which controls handle 16 is turned to the position shown in FIG. 3 causing air pressure to be made available for pressurizing reservoir 63. The resultant pressure of hydraulic fluid in conduit 72 operates to bias check valve 73 in the direction for permitting hydraulic fluid to flow therethrough and into chamber 78 and also through check valve 82 and through conduit 81' to the hydraulic fluid air pressure inlet port 83 of flow control valve 84.

For causing the landing gear shoes 22,22' to descend to the ground through extension of legs 21,21', valve handle 18 is next positioned as shown in FIG. 3 whereupon hydraulic fluid, in response to the air pressure in reservoir 63, flows through conduit 95 and thence through conduits 103,103' to the extension ports 24,24' of each of the landing gear cylinders.

Hydraulic fluid under air pressure is free to enter chamber 46 through ball valve 166 and tubular member 36 as hydraulic fluid leaves chamber 40 and the space 33 surrounding tubular member 36, thence through the respective port 25,25' for being returned to reservoir 63'.

In this manner, the landing gear legs 21,21' fall freely until shoes 22,22' engage the surface upon which the trailer 7 is located. Although air pressure available in tank 63 is not sufficient for elevating a heavily laden trailer, the operator by cycling handle 15 will cause piston 132 within air booster cylinder 134 to be driven back and forth with each cycling of handle 15 for pumping up the hydraulic pressure within chamber 125 to a high level suitable for causing further extension of the gear legs to raise the trailer with the leg assemblies 12,12' firmly and reliably supporting the superimposed load of trailer 7 as well as permitting elevation of the front of the trailer to facilitate disengagement of fifth wheel 6. When the trailer has been raised to a desired height, control valve handle 18 is returned to its center off position and the remaining handles are similarly returned to their center off positions.

It should be here observed that if the trailer is located on an uneven surface whereby the trailer might tend to tip to one side or the other as the gear legs extend, leveling valve 97 may be employed by positioning handle 17 thereof for a time to either side of its center off position whereupon hydraulic fluid for extension purposes will be supplied to only one of the gear leg cylinders, thus causing the leg thereof to extend while the leg of the other assembly remains stationary and permitting the trailer 7 to be levelled as desired.

Assuming that the landing gear legs have each been extended to the desired height, the handle 18 of flow control valve 84 is returned to its center off position as is the handle 16 of tank pressure valve 51. Any of the other valve operating handles are similarly returned to the off position. When hydraulic pressure is no longer available in lines 28,28', the ball valve 166 of each landing gear assembly closes on its seat 168 for entrapping hydraulic fluid with chamber 46. Even if the hydraulic lines were then disconnected or even accidentally severed, hydraulic fluid would remain reliably within the landing gear cylinder to maintain trailer 7 in its elevated, fully supported position. One could, if desired, even effect the repairs on the system or replacement of components thereof without any danger of hydraulic fluid escaping from the landing gear legs to inadvertently lower or drop the trailer.

Trailer 7 is thus an independently supported condition for loading or unloading and will remain so for an indefinite period of time without danger of inadvertent or accidental pressure loss of the hydraulic fluid within each of the landing gear leg assemblies 12,12'. Moreover, when the tractor 1 is driven away, air pressure is no longer available in line 10 for causing operation of any of the components of the system. It may be here observed, that after the trailer has been thus disconnected, if a prankster or other unauthorized person were to manipulate any of handles 15, 16, 17 and 18, no change in the extended condition of the landing gear assemblies will result and thus the system is fully safe from any tampering.

In order to retract the landing gear leg assemblies 12,12' for road travel of trailer 7, the operator of tractor 1 will position tractor 1 with respect to trailer 7 for locating fifth wheel 6 beneath the trailer for engagement thereof and will hook up the air brake system of tractor 1 to that of trailer 7. It may be assumed that each of valve control handles 15, 16, 17 and 18 is in its center off position prior to the air brake system of tractor 1 being hooked up to that of trailer 7.

To effect retraction of the landing gear assemblies 12,12', the operator places handle 16 of tank pressure control valve 51 in the position shown in FIG. 4. Tank 63' is, accordingly, pressurized. Flow control valve handle 18 is then also positioned as shown in FIG. 4. The result in pressure of hydraulic fluid in conduits 30,30' will cause pressure to be developed in chamber 158 of each landing gear cylinder assembly for causing piston 160 to be driven downwardly for causing unseating of ball valve 166 from its seat 168, overcoming the bias of spring 169 and any hydraulic pressure which has been exerted against the ball as a result of hydraulic fluid in chamber 46. It is preferred that coil spring 169 which urges ball valve 166 against its seat 168 be chosen so that same will open when hydraulic pressure in chamber 158 reaches a level corresponding to that of the system air pressure.

With ball valve 166 unseated, hydraulic fluid is free to leave the landing gear cylinders through the respective conduits 28,28' and with such fluid then being returned to tank 63 as the landing gear legs 21,21' are withdrawn into the landing gear cylinders 20,20'. The pressure of the hydraulic fluid being supplied to the landing gear assemblies through conduits 30,30' causes the landing gear legs each fully to retract.

Under some circumstances, it is conceivable that extreme weight may be present on the landing gear legs or that the same may have been extended fully and with hydraulic pressure being entrapped therein at a value sufficiently great to impede unseating of the ball valve 166 from its seat 168. In this event, pump valve handle 15 may be cycled to cause operation of hydraulic booster pump 79 to build up hydraulic pressure within conduits 30,30' to a level sufficient for causing piston 160 to be driven downwardly notwithstanding the high pressure tending to maintain ball valve 166 in its seated position. Thus, the new system allows hydraulic pressure to be built up for gear leg retraction purposes thus precluding the possibility that a leg should remain stuck in its extended condition as sometimes may occur where a trailer is permitted to remain standing with the landing gear legs extended but with heating, as in high temperatures, causing hydraulic pressure to be built up quite high in the landing gear leg cylinders.

As in extending the gear legs, should there be uneven ground or desire to cause leveling or adjustment of the degree of tilt of trailer 7, leveling valve handle 17 may be positioned for a time to the left or right so that only one landing gear leg at a time will be retracting. The handle is then again placed in its center position when the trailer 7 is in a level condition.

The present invention as applied to landing gear tractor-trailer combinations may be utilized with existing trailer constructions without requiring any extensive alteration or substantial modification of the trailer structure. Additionally, it is observed that the new system remains fully operable regardless of variations in the particular line pressure of the air in the tractor brake system since booster pump 79 may be operated as necessary to build a hydraulic pressure to a desired level for effecting proper operation of the system.

Although the foregoing includes a description of the best mode contemplated for carrying out the invention, various modifications are contemplated.

It should be understood that changes in modifications in the formation, construction, arrangement and combination of the several parts of the hydropneumatic system may be made and substituted for these herein shown and described without departing from the nature and principle of my invention. Thus, the description is intended to be illustrative rather than limiting.

Having thus described my invention, what I claim and desire to secure by Letters Patent is:

1. A hydropneumatic system for operating landing gear of a truck trailer and operable from a source of pressurized air, said system comprising first and second sources of hydraulic fluid, hydraulic cylinder means including at least one piston and a landing gear leg interconnected with said piston for providing landing gear leg extension or retraction in response to movement of said piston, said cylinder means having first and second chambers on opposite sides of said piston and each adapted for receiving said hydraulic fluid under pressure, source selection means for enabling hydraulic fluid to be provided by a selected one of said sources, hydraulic pressure boosting means selectively operable from said source of pressurized air for boosting the pressure of hydraulic fluid provided by the selected source to a predetermined value substantially greater than that of said air, valve means for selectively connecting said hydraulic booster means to either of said first or second chambers for receiving pressure-boosted hydraulic pressure from the selected one of said sources for landing gear leg extension or retraction, respectively, and while connecting said second or first chambers, respectively, to the non-selected one of said sources for return of hydraulic fluid thereto, said hydraulic pressure boosting means comprising an air-operated reciprocating pump including an air cylinder and an air-driven piston reciprocal in said air cylinder for boosting said hydraulic pressure of hydraulic fluid received from the selected hydraulic source with each stroke of said air-driven piston, and booster control valve means for selectively connecting said air cylinder to said source of pressurized air, said booster control valve means being adapted successively to connect one end of said air cylinder to said source of pressurized air for causing a pumping stroke of said air piston and subsequently to connect said one end of said air cylinder to the opposite end thereof for causing a return stroke of said air piston while disconnecting said one end from said source of pressurized air, said opposite end of said air cylinder including means for venting of air therefrom during said pumping stroke.

2. A hydropneumatic system according to claim 1, said hydraulic cylinder means comprising first and second hydraulic cylinders, each of said cylinders including a piston and a landing gear leg interconnected therewith for providing independent gear leg extension or retraction in response to movement of the respective piston, each said cylinder having first and second chambers on opposite sides of the respective piston, said source selection means comprising valve means for selectively pressurizing either of said sources of hydraulic fluid from said source of pressurized air, and first and second non-return check valves respectively interconnecting said first and second hydraulic sources with said hydraulic pressure boosting means for providing hydraulic fluid to said boosting means only from the selected one of said hydraulic sources.

3. A hydropneumatic system according to claim 2, and further comprising leveling valve means and conduit means interconnecting said leveling valve means with chambers of said cylinders, said leveling valve means being operable to permit flow of hydraulic fluid selectively with respect to either one or both of said chambers.

4. A hydropneumatic system according to claim 3, said leveling valve means being interconnected by said conduit means with the first chamber of each of said cylinders and said leveling valve means being operable to permit flow of hydraulic fluid selectively from or to either one or both of the respective first chambers of cylinders whereby said landing gear legs can be extended or retracted either independently or concurrently.

5. A hydropneumatic system according to claim 1 said booster control valve means comprising a manually operable valve having a first off position, a second position supplying air to said one end of said air cylinder, a third position connecting said one end to the opposite end of said air cylinder.

6. A hydropneumatic system for operating landing gear of a truck trailer and operable from a source of pressurized air, said system comprising first and second sources of hydraulic fluid, hydraulic cylinder means including a piston and a landing gear leg interconnected with said piston for providing landing gear leg extension or retraction in response to movement of said piston, said cylinder means having first and second chambers on opposite sides of said piston and each adapted for receiving said hydraulic fluid under pressure, source selection means for enabling hydraulic fluid to be provided by a selected one of said sources, hydraulic pressure boosting means including an air cylinder selectively operable from said source of pressurized air for boosting the pressure of hydraulic fluid provided by the selected source to a predetermined value substantially greater than that of said air, valve means for selectively connecting said hydraulic booster means to either of said first or second chambers for receiving pressure-boosted hydraulic pressure from the selected one of said sources for landing gear leg extension or retraction, respectively, and while connecting said second or first chambers, respectively, to the non-selected one of said sources for return of hydraulic fluid thereto, said opposite end of said air cylinder including means for venting of air therefrom during said pumping stroke, said valve means comprising first and second valves, means mechanically interconnecting said valves for joint operation, means for manually controlling said joint operation, a plurality of hydraulic fluid conduits including first conduit means extending from each of the first chambers of said cylinders to said first valve, second conduit means extending from each of the second chambers of said cylinders to said first valve, third conduit means extending between said first and second valves, fourth conduit means extending from said second valve to said first hydraulic fluid source, fifth conduit means extending from said second valve to said second hydraulic fluid source, and sixth conduit means extending from said hydraulic pressure booster means to said first valve, non-return valve means associated with each of said fourth and fifth conduit means for permitting fluid to flow only from said second valve for return to the respective first or second hydraulic fluid source, said first and second valves each having an off position providing no communication between respective ones of said conduit means but each being movable from said off position to either of first and second positions, in said first position, said first valve including means to:

(a) interconnect said first and sixth conduit means and (b) interconnect said second and third conduit means, and said second valve including means to:
(c) interconnect said third and fourth conduit means and
(d) close said fourth conduit means, whereby said work-performing members extend in response to hydraulic fluid from said first hydraulic fluid source, and in said second position, said first valve including means to:
(e) interconnect said first and third conduit means and
(f) interconnect said second and sixth conduit means, and said second valve including means to:
(g) interconnect said third and fourth conduit means and
(h) close said fifth conduit means, whereby said work-performing members retract in response to hydraulic fluid from said second hydraulic fluid source.

7. A hydropneumatic system for operating landing gear of a truck trailer and operable from a source of pressurized air, said system comprising first and second hydraulic fluid reservoirs, first valve means for selectively pressurizing either one of said reservoirs with said pressurized air, a hydraulic cylinder including a work-performing piston and including an elongated member adapted for landing gear leg extension and retraction in response to movement of said piston, said cylinder having a first chamber for receiving pressurized hydraulic fluid for causing movement of said piston for extension of said member and a second chamber for receiving pressurized hydraulic fluid for causing movement of said piston for retraction of said member, second valve means interconnected with each of said reservoirs, and with each of said first and second cylinder chambers, said second valve means being selectively operable between first position and second position, said first position connecting said first one of said reservoirs, when pressurized, with said first chamber for flow of pressurized hydraulic fluid into said first chamber and connecting said second chamber with said second one of said reservoirs, when unpressurized, for flow of hydraulic fluid from said second chamber into said second reservoir, thereby to cause extension of said elongated member, said second position connecting said first one of said reservoirs, when unpressurized, with said first chamber and for connecting said second one of said reservoirs, when pressurized, with said second chamber for permitting flow of hydraulic fluid from said first chamber into said first reservoir and flow of pressurized hydraulic fluid from said second reservoir into said second chamber, thereby to cause retraction of said elongated member, and air-operated pressure boosting means interconnected with a pressurized one of said first and second reservoirs and selectively operable from said source of pressurized air for boosting the pressure of hydraulic fluid supplied by said pressurized reservoir to a value substantially greater than that of said air, said air-operated boosting means comprising a reciprocating pump including an air cylinder and an air-driven piston reciprocal in said air cylinder for boosting said hydraulic pressure with each stroke of said air-driven piston and an air valve for selectively connecting one end of said air cylinder to said source of air pressure for causing a pumping stroke of said air-driven piston with each successive operation of said air valve, said air valve being adapted on each successive operation first to connect said one end of said air cylinder to said source of air pressure for causing a pumping stroke of said air piston and subsequently to connect said one end of said air cylinder to the opposite end thereof for causing a return stroke of said air piston while disconnecting said one end from said source of air pressure, said opposite end of said air cylinder including a vent for venting of air therefrom during said pumping stroke.

8. A hydropneumatic system according to claim 7 and further comprising conduit means interconnecting each end of said air cylinder to said air valve, said air valve being further adapted to vent said opposite end of said air cylinder to atmospheric pressure while connecting said one end to said source of air pressure.

9. A hydropneumatic system according to claim 7, said pressure booster means comprising first and second chambers, said air-operated piston being located in said first chamber, a hydraulic fluid-pumping piston in the last-said second chamber interconnected with said air-operated piston for being reciprocated thereby, a non-return valve interconnecting the last-said second chamber with each of said reservoirs for permitting hydraulic fluid to be drawn into the last-said second chamber for pressure boosting therein and for preventing hydraulic fluid from being pumped back to said reservoirs, a further non-return valve interconnecting the last-said second chamber with said second valve means for supplying hydraulic fluid with boosted pressure thereto through said further return valve.

10. A hydropneumatic system according to claim 7 and further comprising pressure-responsive further valve means for normally retaining hydraulic fluid in said cylinder first chamber for preventing premature, unauthorized flow of fluid therefrom but operable in response to pressure in said second chamber for permitting hydraulic fluid to exit said first chamber, said second valve means when in said second position connecting said second one of said reservoirs, when pressurized, with said second chamber for also causing operation of said further valve means.

* * * * *